(12) United States Patent
Yeo et al.

(10) Patent No.: US 7,631,239 B2
(45) Date of Patent: Dec. 8, 2009

(54) METHOD FOR RETRANSMITTING PACKET IN MOBILE COMMUNICATION SYSTEM AND COMPUTER-READABLE MEDIUM RECORDED PROGRAM THEREOF

(75) Inventors: Kun-Min Yeo, Daejeon (KR); Chul-Sik Yoon, Daejeon (KR); Jae-Heung Kim, Daejeon (KR); Soon-Yong Lim, Daejeon (KR); Byung-Han Ryu, Daejeon (KR)

(73) Assignees: Electronics and Telecommunications Research Institute (KR); Samsung Electronics Co., Ltd. (KR); KT Corporation (KR); SK Telecom Co., Ltd. (KR); KT FREETEL Co., Ltd. (KR); Hanaro Telecom., Inc. (KR)

( * ) Notice: Subject to any disclaimer, the term of this patent is extended or adjusted under 35 U.S.C. 154(b) by 402 days.

(21) Appl. No.: 10/585,052

(22) PCT Filed: Dec. 29, 2004

(86) PCT No.: PCT/KR2004/003511

§ 371 (c)(1),
(2), (4) Date: Apr. 16, 2007

(87) PCT Pub. No.: WO2005/064840

PCT Pub. Date: Jul. 14, 2005

(65) Prior Publication Data

US 2007/0288824 A1    Dec. 13, 2007

(30) Foreign Application Priority Data

Dec. 29, 2003    (KR) .................. 10-2003-0099026
Dec. 27, 2004    (KR) .................. 10-2004-0113342

(51) Int. Cl.
*G08C 25/02* (2006.01)
(52) U.S. Cl. ..................... 714/748; 370/394
(58) Field of Classification Search ............... 370/329, 370/278, 236, 235, 394; 714/248, 249
See application file for complete search history.

(56) References Cited

U.S. PATENT DOCUMENTS 5,151,899 A    9/1992    Thomas et al.
6,505,034 B1    1/2003    Wellig (Continued)

FOREIGN PATENT DOCUMENTS

EP    1 286 491    6/2004

(Continued)

*Primary Examiner*—David Ton
(74) *Attorney, Agent, or Firm*—The Farrell Law Firm, LLP

(57) ABSTRACT

The present invention relates to a method for retransmitting a packet in a mobile communication system. A waiting time for retransmission is established when a packet transmitted from a transmission unit to a receipt unit has no ACK message. A maximum number of times for retransmitting the packet is established when an NACK message is received. The ARQ transmitter moves to a discard state when the maximum management time of the ARQ block expires or the number of times of retransmissions exceeds the maximum number of times of retransmissions, and checks the ACK message receipt. The packet in the transmission buffer is discarded regardless of whether the distant message is transmitted or the discard message is transmitted or the discard message is checked when the ACK message is received.

23 Claims, 14 Drawing Sheets

U.S. PATENT DOCUMENTS

| | | |
|---|---|---|
| 6,519,223 B1 | 2/2003 | Wager et al. |
| 6,574,668 B1 | 6/2003 | Gubbi et al. |
| 6,625,133 B1 * | 9/2003 | Balachandran et al. ...... 370/329 |
| 6,636,488 B1 * | 10/2003 | Varma ........................ 370/278 |
| 6,907,005 B1 * | 6/2005 | Dahlman et al. ............ 370/236 |
| 2002/0080719 A1 * | 6/2002 | Parkvall et al. ............. 370/235 |
| 2002/0165973 A1 | 11/2002 | Ben-Yehezkel et al. |
| 2003/0026261 A1 * | 2/2003 | Jeanne et al. ............... 370/394 |
| 2003/0079169 A1 | 4/2003 | Ho et al. |
| 2003/0210669 A1 | 11/2003 | Vayanos et al. |

FOREIGN PATENT DOCUMENTS

| | | |
|---|---|---|
| KR | 1020010040158 | 7/2001 |
| WO | WO 00/57594 | 9/2000 |
| WO | WO 00/60799 | 10/2000 |
| WO | WO 00/62466 | 10/2000 |
| WO | WO 01/37473 | 5/2001 |

\* cited by examiner

[FIG. 1]
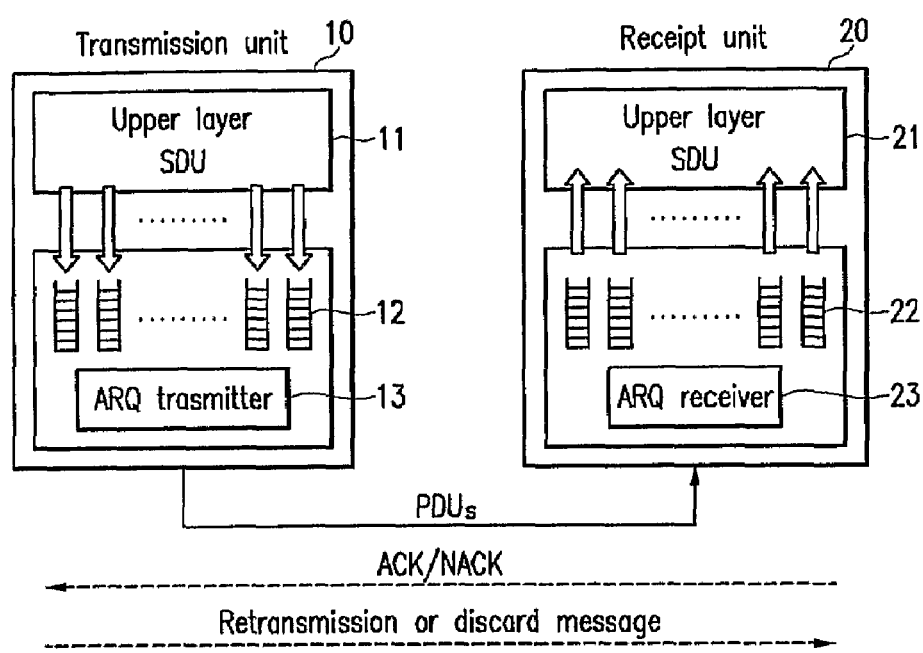

[FIG. 2]
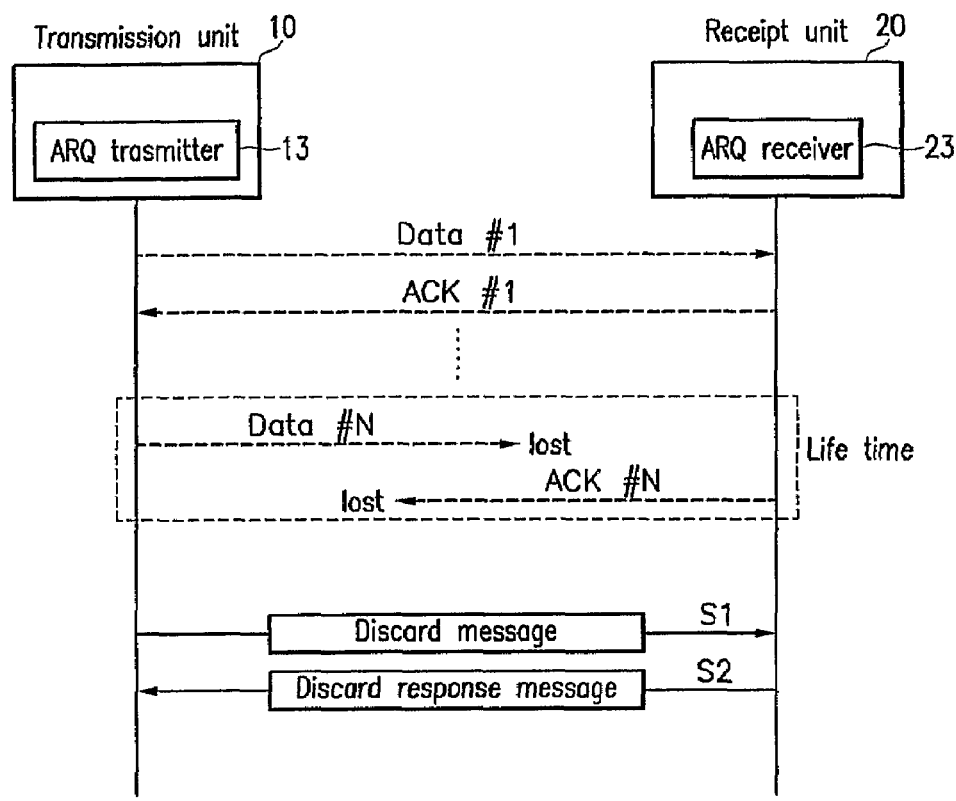

[FIG. 3]
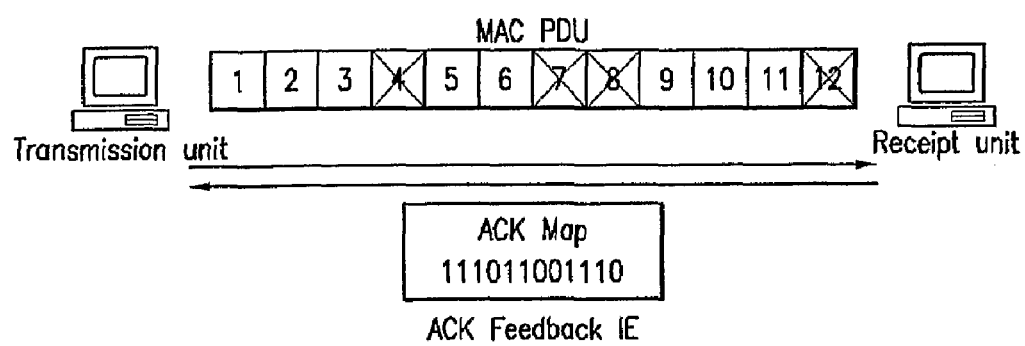

[FIG. 4]
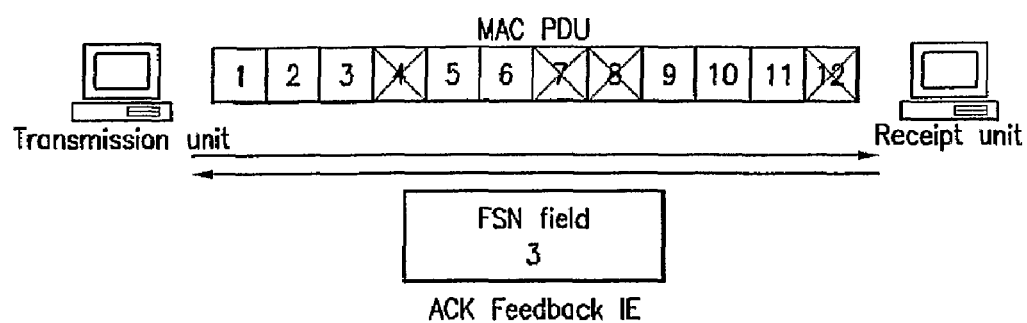

[FIG. 5]
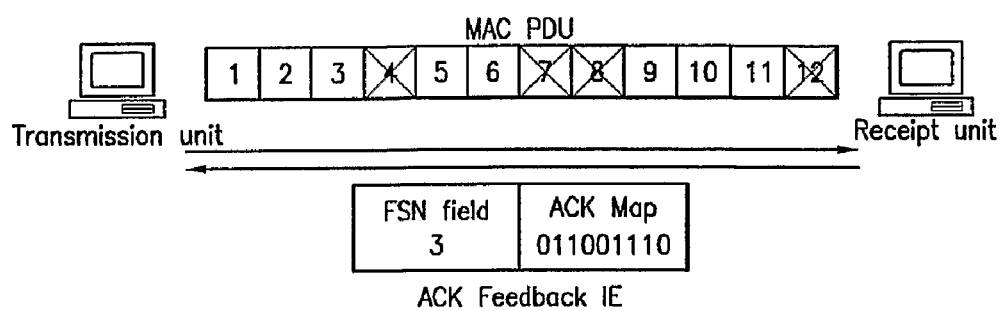

[FIG. 6]
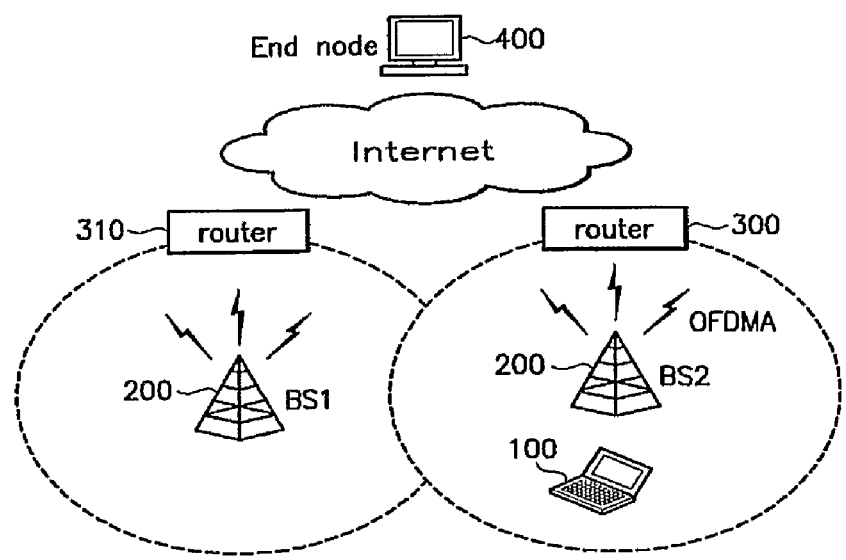

[FIG. 7]
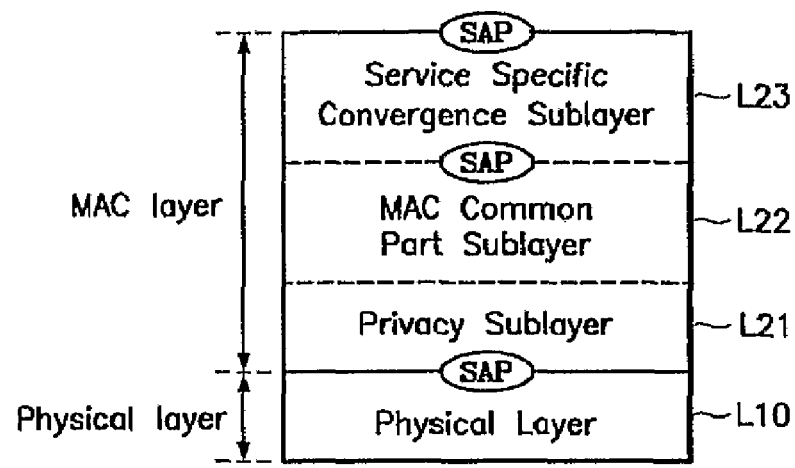

[FIG. 8]
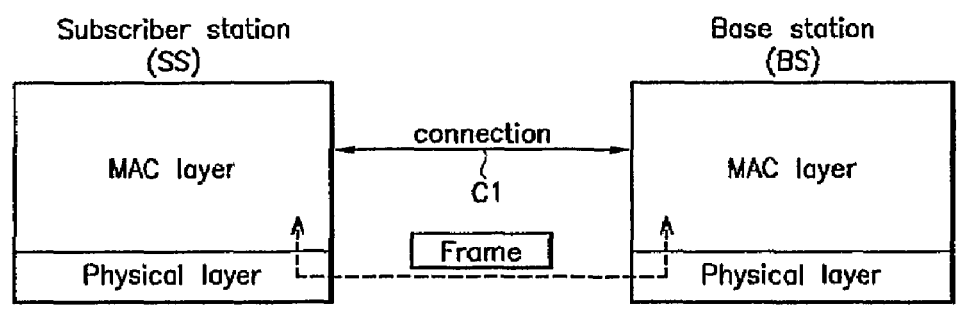

[FIG. 9]
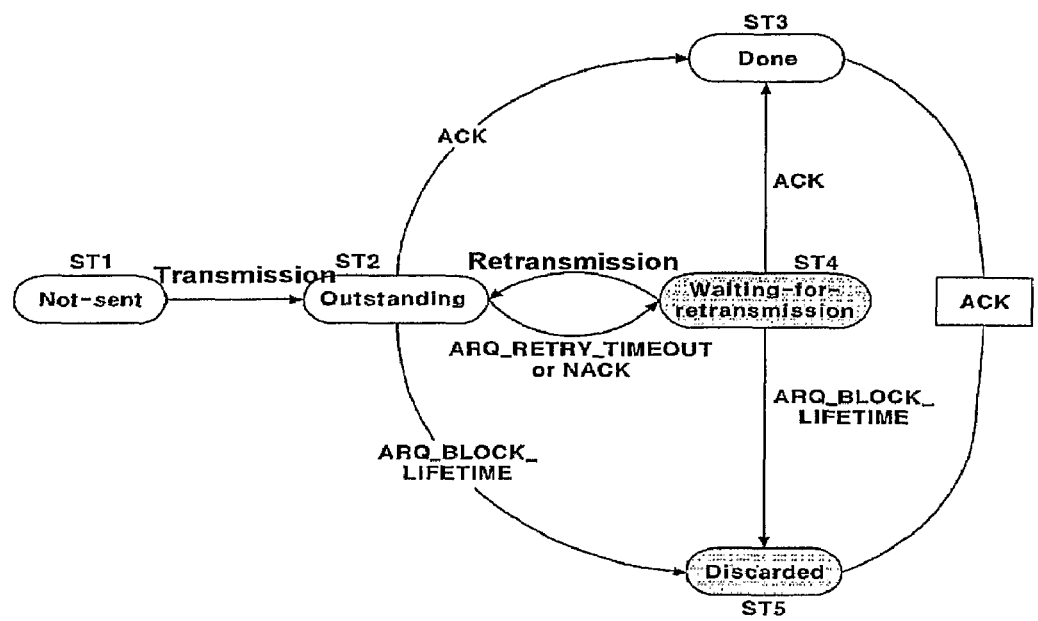

[FIG. 10]
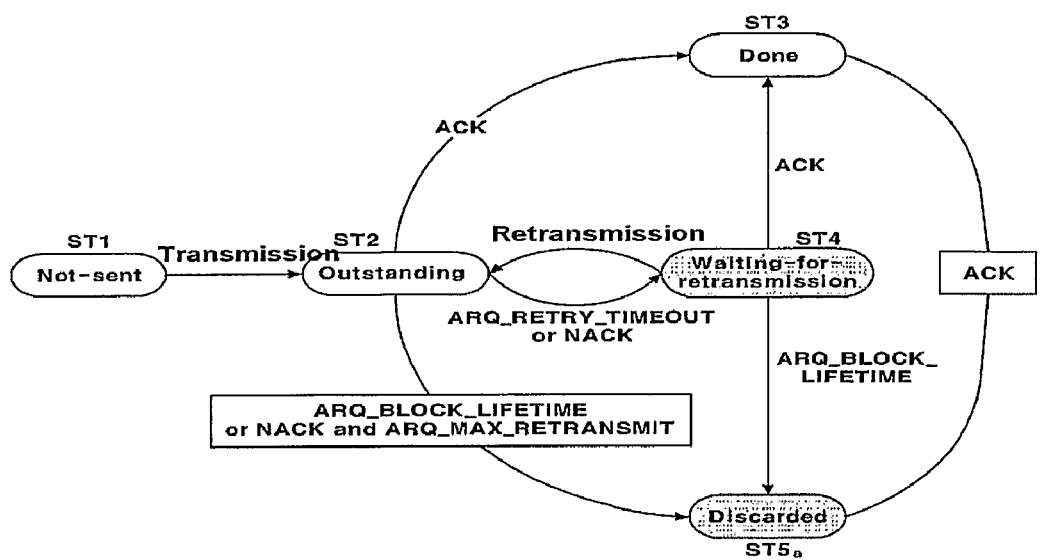

[FIG. 11]
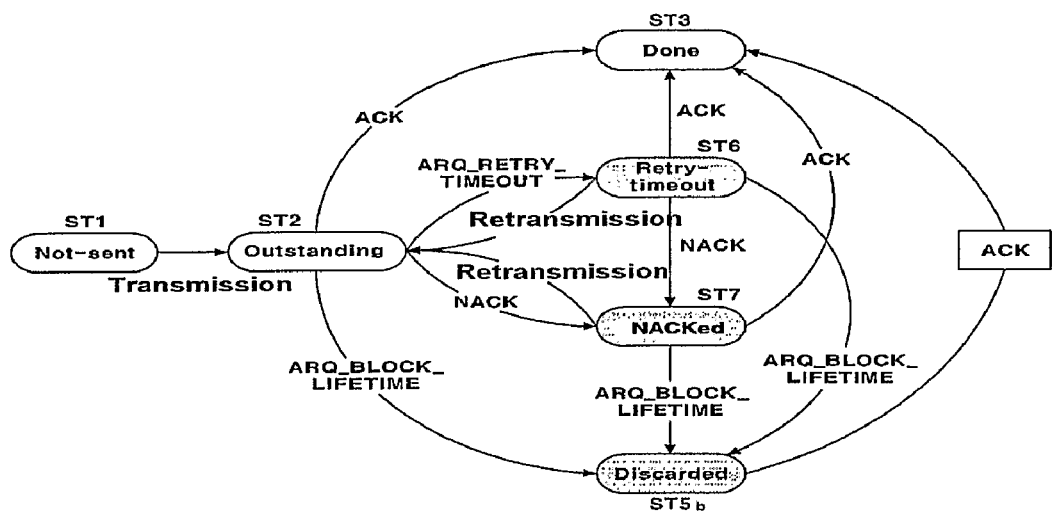

[FIG. 12]
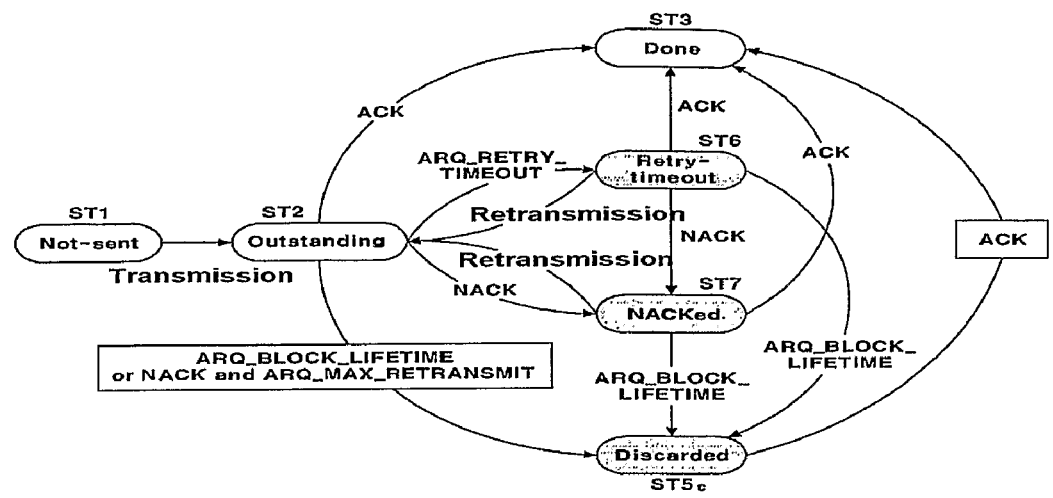

[FIG. 13]
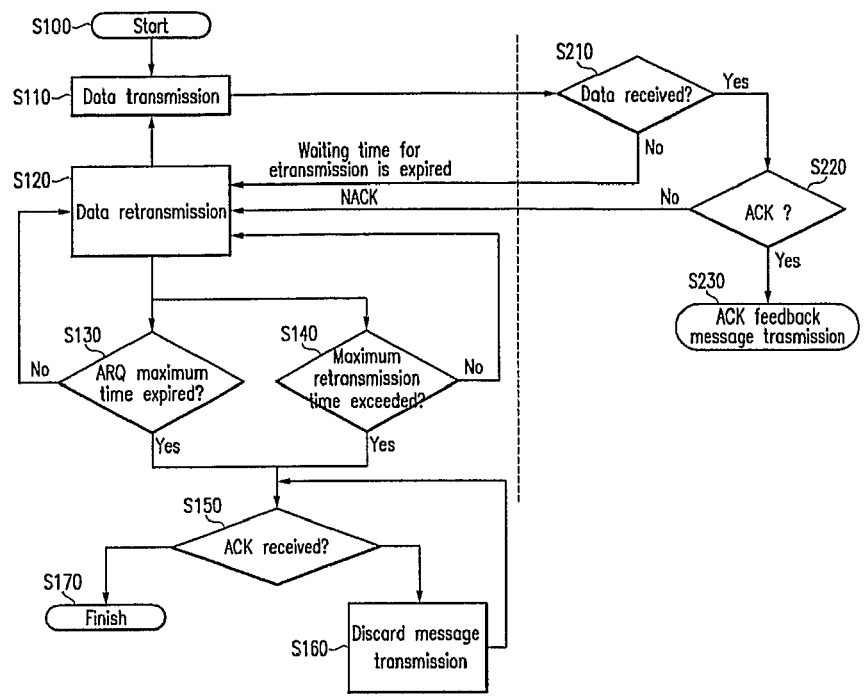

[FIG. 14]
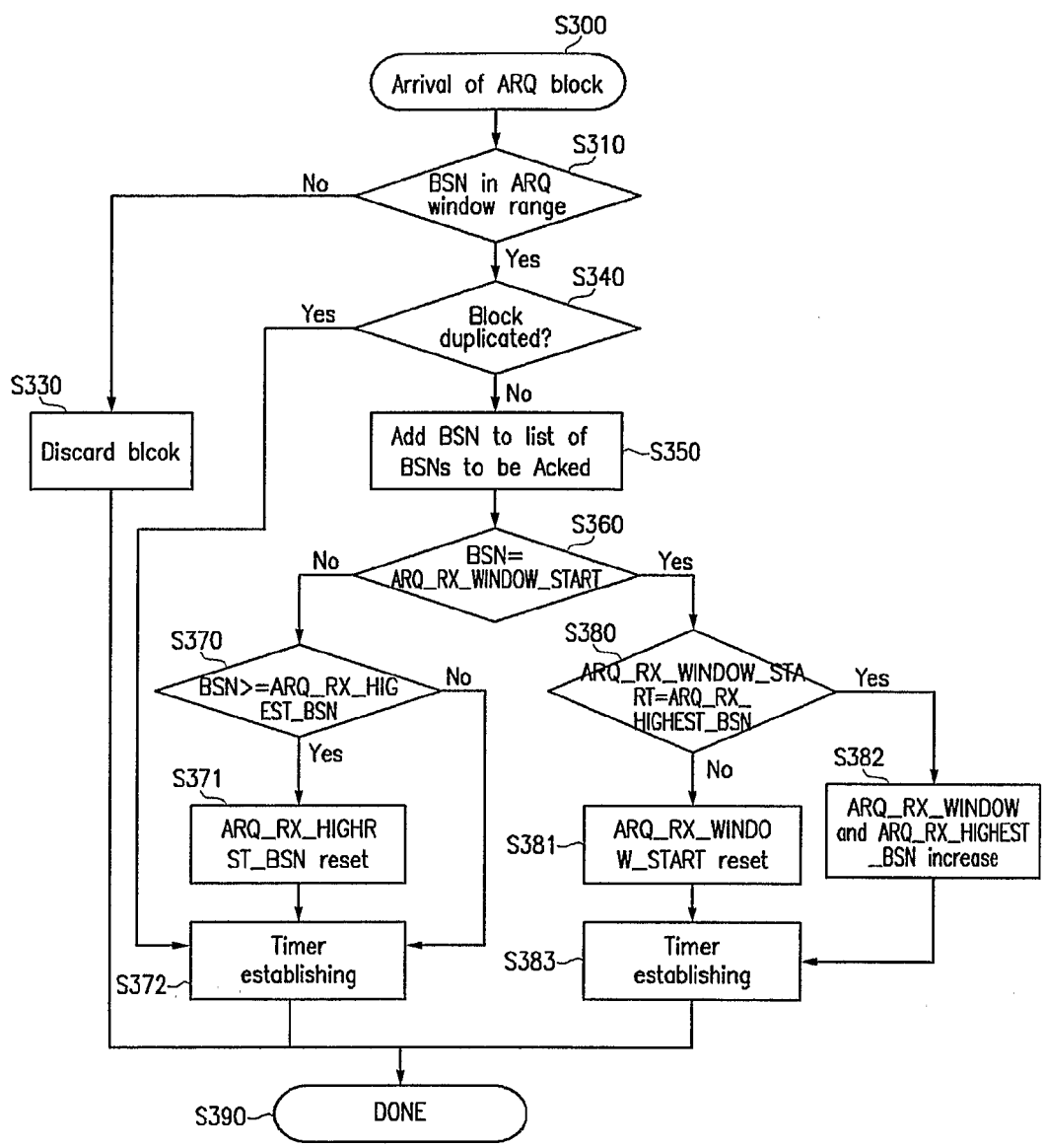

METHOD FOR RETRANSMITTING PACKET IN MOBILE COMMUNICATION SYSTEM AND COMPUTER-READABLE MEDIUM RECORDED PROGRAM THEREOF

BACKGROUND OF THE INVENTION (a) Field of the Invention

The present invention relates to a method for efficiently retransmitting a packet in a mobile communication system. More specifically, the present invention relates to an automatic repeat request (ARQ) method for providing efficient buffer management and efficient scheduling methods (b) Description of the Related Art In mobile wireless technology, specifically in a wireless portable internet system, an automatic repeat request (ARQ) algorithm is proposed in order to minimize an error rate and increase error correction efficiency.

The ARQ algorithm is a method for retransmitting a damaged packet with reference to an acknowledgement (ACK) or a negative acknowledgement (NACK) message for each transmitted packet, or with reference to a timeout when the packet is not received.

FIG. 1 shows a block diagram for representing an ARQ transmitter and an ARQ receiver.

A transmission unit 10 transmits a protocol data unit PDU to a receipt unit. The PDU is generated from a service data unit SDU in an upper layer 11 and stored to a buffer 12, and transmitted according to the ARQ mechanism. The PDU includes packet type data.

An ARQ receiver 23 transmits an ARQ feed back message having acknowledgement ACK or negative acknowledgement NACK information according to PDU transmission success or failure.

The ARQ feed back message is used in order to correct an error by using the ARQ in the wireless portable internet system. An ACK message or a NACK message is used as the ARQ feed back message according to the PDU receipt success or failure.

An ARQ transmitter 13 retransmits the PDU or transmits a discard message to the ARQ receiver 23 according to the ACK or NACK message.

As described, data transmission efficiency according to the receipt unit or channel is analyzed by the transmit unit 10 with reference to the receipt success or failure efficiency in the automatic retransmission. Later, the receipt success or failure efficiency is used for quality of service (QoS) analysis and scheduling operation.

FIG. 2 shows a signal flow chart for describing the conventional ARQ method.

When the transmission unit 10 transmits data by using the packet, the receipt unit 20 transmits the ACK message as the ARQ feed back message for the data. There are cumulative and selective ACK messages as the ACK message. The ACK message will be described in detail later.

The ARQ receiver 23 transmits the proper ACK message according to the data packet receipt. However, the data packet is lost and not received by the ARQ receiver when a communication channel quality is bad.

Due to the data packet loss, the ACK message is lost, and therefore the transmission unit 10 receives no ACK message. When the data packet or ACK message is lost, the ARQ transmitter or the ARQ receiver could not wait unlimitedly or retransmit the data. Instead, the data packet is discarded after a predetermined lifetime.

Conventionally, the ARQ transmitter transmits a discard message in step S1 when the data packet or the ACK message is lost and the transmission unit receives no ACK message for the predetermined lifetime.

The ARQ receiver transmits a discard response message in response to the discard message, and the ARQ transmitter discards the transmitted data packet in step S2 when the ARQ transmitter receives the discard response message.

FIGS. 3 to 5 respectively show ARQ feed back message types in the wireless portable internet system.

FIG. 3 shows a selective ACK message.

As shown in FIG. 3, it is assumed that 12 PDUs are transmitted to the receive unit in a medium access control (MAC) layer of the wireless portable internet system, and errors occur in the PDUs corresponding to the fourth, seventh, eighth, and twelfth sequence numbers. The receiver in the receive unit transmits an ACK MAP as the ARQ feed back message in response to the PDUs. A receipt success is mapped as 1 and a receipt error or failure is mapped as 0 in the ACK MAP. The PDU corresponding to the sequence number received by the ARQ transmitter and mapped as 0 is retransmitted according to the ACK MAP.

FIG. 4 shows a cumulative ACK message.

When the errors occur in the PDUs corresponding to the fourth, seventh, eighth, and twelfth sequence numbers as in FIG. 3, the ARQ receiver records up to the sequence number of the PDUs which were successfully received, and frames the ARQ feedback message in FIG. 4.

Accordingly, the PDU corresponding to the third sequence number is notified to be successfully received, and the ARQ transmitter retransmits the PDUs corresponding to the fourth sequence to the twelfth sequence numbers.

FIG. 5 shows a selective-cumulative mixed ACK message.

While the selective ACK message shown in FIG. 3 is efficient because it retransmits the PDUs having a receipt error, a data processing time and the message of the ACK map are problematically increased. While the cumulative ACK message shown in FIG. 4 has a smaller message size and is a higher speed process, data to be retransmitted are problematically increased.

FIG. 5 shows a method requesting retransmission by framing the sequence number of the successfully received PDUs with an ACK map after the sequence number. The method combines advantages of the selective ACK message and the cumulative ACK message.

As described above, in the prior art, the discard message is transmitted when the predetermined lifetime is passed after the data is transmitted, and the discard operation is completed when the discard response message for the discard message is received. Accordingly, an additional feedback message is required for the discard operation beside the ACK message.

An appropriate scheduling operation is not performed when the ARQ transmitter entering the discard state after the predetermined time is correspondingly treated with the ARQ transmitter entering the discard state by the transmission failure (NACK). At this time, a block loss rate for a session is not accurately calculated because the discard information of the QoS contains fallacy statistics.

SUMMARY OF THE INVENTION

The present invention provides a method for retransmitting a packet in order to efficiently process a loss of a block.

The present invention also provides a method for retransmitting a packet in order to reduce an overhead of a message and efficiently manage a buffer.

The present invention also provides a method for retransmitting a packet in order to fairly retransmit the packet by exact calculation of QoS between sessions.

The present invention discloses a method for retransmitting a packet in a mobile communication system. In the method: a) a waiting time for retransmitting a packet is established when the packet which is transmitted to the receipt unit from a transmission unit does not include an acknowledgement (ACK) message; b) an automatic repeat request (ARQ) transmitter retransmits the packet when the waiting time for retransmitting the packet expires; and c) the ARQ transmitter determines whether a maximum management time of an ARQ block expires, moves to a discard state in order to discard the packet in a buffer of the transmission unit when the maximum management time of an ARQ block expires, and waits for an ACK message. The transmission unit, in the discard state, transmits a discard message for the packet to the receipt unit, and discards the packet in the buffer of the transmission unit regardless of the discard message transmission when receiving the ACK message.

At this time, the ACK message waiting in the discard state has an ACK message for the packet and an ACK message for the discard message.

Also, in the method: d) the maximum number of times of packet retransmissions to the receipt unit is established; f) whether a negative acknowledgement (NACK) message indicating an error of the packet transmission is received from the receipt unit is determined, and the packet is retransmitted when the NACK message is received; and g) the ARQ transmitter moves to the discard state when a number of times of retransmissions exceeds the maximum number of times of retransmissions after step f).

The present invention also discloses a computer readable medium having a program for retransmitting a packet in a mobile communication system. In the program: a) a waiting time for retransmission is established when a packet transmitted to a receipt unit from a transmission unit has no ACK message; b) an ARQ transmitter retransmits the packet when the waiting time for retransmission expires; and c) the ARQ transmitter determines whether a maximum management time of an ARQ block expires, moves to a discard state for the purpose of discarding the packet in a buffer of the transmission unit when the maximum management time of the ARQ block expires, and waits for an ACK message. At this time, the transmission unit in the discard state transmits a discard message for the packet to the receipt unit, and discards the packet in the buffer of the transmission unit regardless of the discard message transmission when receiving the ACK message.

Also, in the program: d) the maximum number of times for retransmitting the packet to the receipt unit is established; f) whether a NACK message indicating an error of the packet transmission is received from the receipt unit is determined, and the packet is retransmitted when the NACK message is received; and g) the ARQ transmitter moves to the discard state when the number of times of retransmissions exceeds the maximum number of times of retransmissions after step f).

The present invention also provides a method for receiving an Automatic Repeat reQuest (ARQ) block that includes if an ARQ block is received, determining if a block sequence number of the ARQ block is in a range of a receipt window; if the block sequence number of the ARQ block is in the range of the receipt window, determining if the ARQ block is a duplicate of a previously received ARQ block; if the ARQ block is not a duplicate and the block sequence number of the ARQ block is not less than a highest block sequence number of received ARQ blocks, updating the highest block sequence number of received blocks to a next greater value than the block sequence number of the ARQ block; and if the ARQ block is not a duplicate and the block sequence number of the ARQ block is equal to a start block sequence number of the receipt window, updating the start block sequence number of the receipt window to a next greater value than the block sequence number of the ARQ block.

The present invention also provides a computer-readable medium that stores instructions executable by at least one processor to perform a method that includes if an ARQ block is received, determining if a block sequence number of the ARQ block is in a range of a receipt window; if the block sequence number of the ARQ block is in the range of the receipt window, determining if the ARQ block is a duplicate of a previously received ARQ block; if the ARQ block is not a duplicate and the block sequence number of the ARQ block is not less than a highest block sequence number of received blocks, updating the highest block sequence number of received blocks to a next greater value than the block sequence number of the ARQ block; and if the ARQ block is not a duplicate and the block sequence number of the ARQ block is equal to a start block sequence number of the receipt window, updating the start block sequence number of the receipt window to a next greater value than the block sequence number of the ARQ block.

The present invention also provides a method for a transmitter to retransmit a packet to a receiver that includes if a transmitter does not receive an acknowledgment message for a packet transmitted to the receiver, setting a retransmission timeout; if the retransmission timeout expires, retransmitting the packet; if a maximum management time expires, transmitting a discard message for the packet to the receiver and transiting to a discarded state; and if the transmitter receives, in the discarded state, the acknowledgment message for the packet or an acknowledgment message for the discard message, discarding the packet from a transmitting buffer.

The present invention also provides a computer-readable medium that stores instructions executable by at least one processor to perform a method that includes if a transmitter does not receive an acknowledgment message for a packet transmitted to a receiver, setting a retransmission timeout; retransmitting the packet if the retransmission timeout expires; if a maximum management time expires, transmitting a discard message for the packet to the receiver and transiting to a discarded state; and if the transmitter receives, in the discarded state, an acknowledgment message for the packet or an acknowledgment message for the discard message, discarding the packet from a transmitting buffer.

The present invention also provides a method for a transmitter to retransmit an Automatic Repeat reQuest (ARQ) block to a receiver that includes if the transmitter transmits the ARQ block to the receiver in a not-sent state of the ARQ block, transiting a state of the ARQ block to an outstanding state; if the transmitter does not receive an acknowledgment message for the ARQ block for a timeout in the outstanding state, or if the transmitter receives a non-acknowledgment message for the ARQ block in the outstanding state, transiting the state of the ARQ block to a retransmission-waiting state; if the transmitter retransmits the ARQ block to the receiver in the retransmission-waiting state, transiting the state of the ARQ block to the outstanding state; if a lifetime of the ARQ block expires in the outstanding state, transiting the state of the ARQ block to a discarded state; and if the transmitter receives, in the discarded state, an acknowledgment message for the ARQ block or an acknowledgment message for a discard message for the ARQ block, transiting the state of the ARQ block to a done state.

The present invention also provides a method for a transmitter to retransmit an automatic repeat request (ARQ) block to a receiver that includes if the transmitter transmits the ARQ block to the receiver in a not-sent state of the ARQ block, transiting a state of the ARQ block to an outstanding state; if the transmitter does not receive an acknowledgment message for the ARQ block for a timeout in the outstanding state, transiting the state of the ARQ block to a retry-timeout state; if the transmitter receives a non-acknowledgment message for the ARQ block in the outstanding state, transiting the state of the ARQ block to a non-acknowledged state; if the transmitter receives a non-acknowledgment message for the ARQ block in the retry-timeout state, transiting the state of the ARQ block to the non-acknowledged state; if the transmitter retransmits the ARQ block to the receiver in the retry-timeout state, transiting the state of the ARQ block to the outstanding state; if the transmitter retransmits the ARQ block to the receiver in the non-acknowledged state, transiting the state of the ARQ block to the outstanding state; if a lifetime of the ARQ block expires in the outstanding state, transiting the state of the ARQ block to the discarded state; and if the transmitter receives, in the discarded state, an acknowledgment message for the ARQ block or an acknowledgment message for a discard message for the ARQ block, transiting the state of the ARQ block to a done state.

BRIEF DESCRIPTION OF THE DRAWINGS

The accompanying drawings, which are incorporated in and constitute a part of the specification, illustrate preferred embodiments of the invention, and, together with the description, serve to explain the principles of the invention.

FIG. 1 shows a block diagram representing an ARQ transmitter and an ARQ receiver.

FIG. 2 shows a signal flow chart describing the conventional ARQ method.

FIG. 3 shows a selective ACK message.

FIG. 4 shows a cumulative ACK message.

FIG. 5 shows a selective-cumulative mixed ACK message.

FIG. 6 shows a wireless portable internet network configuration according to an exemplary embodiment of the present invention in a wireless portable internet.

FIG. 7 shows a diagram representing a layer configuration of the wireless portable internet system according to an exemplary embodiment of the present invention.

FIG. 8 schematically shows a diagram representing a connection between the base station and the subscriber station in the wireless portable internet system according to an exemplary embodiment of the present invention.

FIG. 9 shows a diagram representing an operation of the ARQ transmitter according to an exemplary embodiment of the present invention.

FIG. 10 shows a diagram representing an operation of the ARQ transmitter according to another exemplary embodiment of the present invention.

FIG. 11 shows a diagram representing an operation of an ARQ transmitter according to another exemplary embodiment of the present invention.

FIG. 12 shows a diagram representing an operation of an ARQ transmitter according to another exemplary embodiment of the present invention.

FIG. 13 shows a flow chart for representing a method for retransmitting a packet according to an exemplary embodiment of the present invention.

FIG. 14 shows a flow chart for representing an operation of the ARQ receiver according to an exemplary embodiment of the present invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

FIG. 6 shows a wireless portable internet network configuration according to an exemplary embodiment of the present invention.

The wireless portable internet system includes a subscriber station 100, base stations 200 and 200 for performing a radio communication with the subscriber station 100, routers 300 and 310 coupled to the base stations through a gate way, and an internet.

In the wireless portable internet system, a seamless data communication service is guaranteed to be provided even when the subscriber station 100 shown in FIG. 6 moves from a cell controlled by the base station 200 to another cell controlled by the other base station 200, a handover for the subscriber station 100 is supported as in a mobile communication service, and a dynamic IP address is allocated according to movement of the subscriber station.

While the orthogonal frequency division multiple access (OFDMA) method is used for the wireless portable internet subscriber station 100 to communicate with the base stations 200 and 200, the communication method may include other communication methods in addition to the OFDMA method. The OFDMA method has a high data rate and effectiveness against multi-path fading.

An adaptive modulation and coding (AMC) scheme for adaptively selecting modulation and coding methods by request/acceptance between the subscriber station and the base stations 200 and 200 is applied in the IEEE 802.16e standard wireless portable internet system.

FIG. 7 shows a diagram for representing a layer configuration of the wireless portable internet system according to the exemplary embodiment of the present invention.

The layer configuration of the IEEE 802.16e standard wireless portable internet system includes a physical layer L10 and a medium access control (MAC) layer L21, L22, and L23. The physical layer L10 performs radio communication functions such as modulating/demodulating and coding functions in the conventional physical layer.

While subdivided layers for respective functions are provided in a wired internet system, various functions are performed in one MAC layer in the wireless portable internet system. The MAC layer includes a privacy sublayer L21, a MAC common part sublayer L22, and a service specific convergence sublayer L23 according to respective functions.

The service specific convergence sublayer L23 provides payload header suppression and QoS mapping functions in a seamless data communication.

The MAC common part layer L22, as a core part in the MAC layer, performs system access, bandwidth allocation, connection establishment, connection maintenance, and QoS management functions.

The privacy sublayer L21 provides apparatus authentication, secure key exchange, and encryption functions. The apparatus authentication is performed in the privacy sublayer L21, and user authentication is performed in an upper layer (not illustrated) of the MAC layer.

FIG. 8 schematically shows a diagram for representing a connection between the base station and the subscriber station in the wireless portable internet system according to the exemplary embodiment of the present invention.

There is a connection referred to as Connection C1 between the MAC layer of the subscriber station SS and the MAC layer of the base station BS. At this time, the Connection C1 is not a physical connection but a logical connection, which is defined by a mapping relation between MAC peers of the subscriber station SS and the base station BS in order to transmit a traffic for a service flow.

Accordingly, a parameter or a message defined in the Connection C1 defines a function between MAC peer layers. Practically, the parameter or the message is framed and transmitted through the physical layer, and the frame is analyzed and used for performing the function corresponding to the parameter or the message in the MAC layer. The MAC message includes various messages for request REQ, response RSP, and acknowledgement ACK functions.

The ACK for the packet transmission is done by using the MAC message when the method for retransmitting the packet according to the exemplary embodiment of the present invention is applied to the wireless portable internet system.

FIG. 9 shows a diagram representing an operation of the ARQ transmitter according to the exemplary embodiment of the present invention.

Parameters used in the ARQ transmitter and receiver shown in FIG. 9 will be defined as follows. The parameters to be described correspond to values for changing the ARQ transmitter state in the transmission unit.

ARQ_BSN_MODULUS: a number of unique block sequence number values.

ARQ_BLOCK_LIFETIME: a maximum time interval managed by the ARQ transmitter once initial transmission has occurred.

ARQ_RETRY_TIMEOUT: a time interval a transmitter shall wait before retransmission of an unacknowledged block.

ARQ transmitter states shown in FIG. 9 will be respectively defined as follows.

Not-sent (ST1): a state in which a packet has not been transmitted yet.

Outstanding (ST2): a state in which a packet is transmitting (and retransmitting)

Done (ST3): a state in which an ACK message is received.

Waiting-for-retransmission (ST4): a state in which an NACK message is received or a time for receiving an ACK message exceeds ARQ_RETRY_TIMEOUT after transmission.

Discarded (ST5): a state in which a time for receiving an ACK message exceeds ARQ_BLOCK_LIFETIME after initially transmitting the packet.

For convenience of description, the respective states will be referred to as states ST1 to ST5.

In the exemplary embodiment of the present invention, when a packet is transmitted to the receipt unit from the transmission unit, the ARQ transmitter waits for an ACK message for indicating a successful transmission, and moves to a state of ST3 when receiving the ACK message.

The ARQ transmitter moves to a state of ST4 to request retransmission of packet when the ARQ transmitter receives an NACK message for the transmitted packet or the ARQ_RETRY_TIMEOUT period expires. The ARQ transmitter receives the ACK message and moves to the state of ST3 when the ARQ receiver successfully receives the packet in the state of ST4.

The ARQ transmitter, however, moves to a state of ST5 when the predetermined period of ARQ_BLOCK_LIFETIME expires in the state of ST2 for retransmission or the state of ST4 for waiting for retransmission.

Because the ARQ transmitter has moved to a discard state for discarding the transmitted packet in the state of ST5, the ARQ transmitter moves to the state of ST3 regardless of the ARQ discard message transmission to discard the transmitted packet when receiving the ACK message. That is, the ARQ transmitter moves to the state of ST3 to discard the packet to be transmitted to the buffer regardless of whether it is the ACK message for the discarded message or the ACK message for the transmitted packet when the ACK message as an ARQ feedback message is received. It is efficient to discard the packets in the buffer for the purpose of managing the buffer when the receive unit successively receives the transmitted data packet and the ARQ transmitter receives an ACK message, or the ARQ transmitter discards the packet in the buffer according to a predetermined condition.

Accordingly, the buffer is efficiently managed and an overhead of the ARQ feedback message for responding to the discard message is reduced because a response to the discard message is performed by the ARQ feedback message and the ARQ transmitter moves to the state of ST3 regardless of the discard message transmission when receiving the ACK message.

FIG. 10 shows a diagram representing an operation of the ARQ transmitter according to the exemplary embodiment of the present invention.

Parameters used in the ARQ transmitter and receiver shown in FIG. 10 will be defined as follows.

ARQ_BSN_MODULUS: a number of unique block sequence number values.

ARQ_BLOCK_LIFETIME: a maximum time interval managed by the ARQ transmitter once initial transmission has occurred.

ARQ_RETRY_TIMEOUT: a time interval a transmitter shall wait before retransmission of an unacknowledged block.

ARQ_MAX_RETRANSMIT: a maximum number of times of retransmissions.

ARQ transmitter states shown in FIG. 10 will be respectively defined as follows.

Not-sent (ST1): a state in which a packet has not been transmitted yet.

Outstanding (ST2): a state in which a packet is transmitting (and retransmitting)

Done (ST3): a state in which an ACK message is received.

Waiting-for-retransmission (ST4): a state in which a NACK message is received or a time for receiving an ACK message exceeds ARQ_RETRY_TIMEOUT after transmitting.

Discarded (ST5a): a state in which a time for receiving an ACK message exceeds ARQ_BLOCK_LIFETIME after initial transmission or a number of times of retransmissions exceed a maximum number of times of retransmissions after the NACK is received.

In the exemplary embodiment shown in FIG. 10, when a packet is transmitted to the receipt unit from the transmission unit, the ARQ transmitter waits for the ACK message for indicating a successful transmission. When receiving the ACK message, the ARQ transmitter moves to the state of ST3.

The ARQ transmitter moves to the state of ST4 to request retransmission when the ARQ transmitter receives the NACK message of the packet being transmitted or the ARQ_RETRY_TIMEOUT period expires. The ARQ transmitter receives the ACK message and moves to the state of ST3 when the packet is successfully received by retransmission of the packet in the state of ST4.

The ARQ transmitter, however, moves to a state of ST5a when the predetermined period of ARQ_BLOCK_LIFETIME expires in the state of ST2 for retransmitting the packet or the state of ST4 for waiting for retransmitting the packet. In addition, in the exemplary embodiment shown in FIG. 10, the packet is retransmitted when the NACK message is received in the state of ST4. At this time, the ARQ transmitter moves to the state of ST5a when the number of times of performed retransmissions exceeds a predetermined number of times of retransmissions.

That is, as shown in FIG. 10, the ARQ transmitter moves to the state of ST5a to discard the packet when the number of times of retransmissions exceeds the predetermined number of times of retransmissions when the ARQ_BLOCK_LIFETIME does not expire when the ARQ transmitter receives the NACK message. Accordingly, a time at which the discard message is transmitted will be differently controlled according to whether the ARQ transmitter receives the NACK message or not.

The time at which the discard message is transmitted is differently controlled in order to appropriately control the number of times of packet retransmissions by separately managing the ARQ transmitter receiving the NACK message and the ARQ transmitter receiving no NACK message. For example, packets will not be appropriately retransmitted when a packet is retransmitted once and then discarded, and another packet is retransmitted many times and discarded. That is, when QoS statistics are calculated only with reference to the ARQ_BLOCK_LIFETIME, the statistics of a session having performed a great number of times of retransmissions correspond to the statistics of a session having performed a less number of times of retransmissions, and therefore fallacy statistics are given.

According to the exemplary embodiment shown in FIG. 10, the fallacy statistics are prevented and efficient scheduling is then provided.

The ARQ transmitter moves to the state of ST3 to discard the transmitted ACK message regardless of the ARQ discard message transmission when receiving the ACK message, because the ARQ transmitter has moved to the discard state of the transmitted packet in the state of ST5a shown in FIG. 10. That is, when the ARQ_BLOCK_LIFETIME expires and the number of times of retransmissions exceeds the maximum number of times of retransmissions while the ARQ transmitter receives the NACK message, the ARQ transmitter moves to the state of ST3 to discard the packet to be transmitted in the buffer regardless of whether it is the ACK message for the discarded message or the ACK message for the transmitted packet when the ACK message is received.

Accordingly, the buffer of the ARQ transmitter is efficiently managed because the response to the discard message is performed by the ARQ feedback message.

FIG. 11 shows a diagram representing an operation of an ARQ transmitter according to another exemplary embodiment of the present invention.

Comparing to the exemplary embodiments shown in FIGS. 7 and 8, the following states will be further defined in the exemplary embodiment shown in FIG. 11. A description of parts which have been described in the above exemplary embodiments of the present invention will be omitted.

Retry-timeout (ST6): a state in which a time for receiving the ACK message exceeds the ARQ_RETRY_TIMEOUT after a transmission.

NACKed (ST7): a state in which the NACK message is received.

Discarded (ST5b): a state in which a time for receiving the ACK message exceeds the ARQ_BLOCK_LIFETIME after an initial transmission.

In the exemplary embodiment shown in FIG. 11, the retransmission is processed by dividing into a state of ST6 and a state of ST7 when the retransmission is requested.

In the state of ST6, the ARQ transmitter moves to the state of ST7 when the ARQ transmitter receives the NACK message.

The ARQ transmitter moves to a state of ST5b when the ARQ_BLOCK_LIFETIME period expires in the states of ST2, ST6, and ST7.

When the ARQ transmitter is in the state of ST5b, the ARQ transmitter moves to the state of ST3 regardless of the discard message transmission when the ARQ transmitter receives the ACK message as the ARQ feedback message.

FIG. 12 shows a diagram for representing an operation of an ARQ transmitter according to another exemplary embodiment of the present invention.

In the exemplary embodiment shown in FIG. 12, a state of ST5c will be defined as follows, and the other states correspond to those in the exemplary embodiment shown in FIG. 11.

Discarded (ST5c): a state in which a number of times of retransmissions exceeds a maximum number of times of retransmissions after the NACK message is received in the state in which a time for receiving the ACK message exceeds the ARQ_BLOCK_LIFETIME period after the initial transmission or the state of "outstanding."

In the exemplary embodiment shown in FIG. 12, the ARQ transmitter moves to the state of ST7 in which the NACK message is received in the state of ST6, and moves to a state of ST5c when the ARQ_BLOCK_LIFETIME period expires in the states of ST2, ST6, and ST7.

At this time, in the state of ST2, the ARQ transmitter moves to the state of ST5c not only when the ARQ_BLOCK_LIFETIME period expires but also when the number of times of retransmissions in the NACKed state exceeds the predetermined maximum number of times of retransmissions ARQ_MAX_RETRANSMIT.

That is, in the exemplary embodiment shown in FIG. 12, the ARQ transmitter moves to the state of ST5c to discard the packet when the number of times of retransmissions exceeds the predetermined number of times of retransmissions when the ARQ_BLOCK_LIFETIME period does not expire in the state of ST2 in which the ARQ transmitter receives the NACK message to retransmit the packet. Accordingly, a time at which the discard message is transmitted will be differently managed according to whether the NACK message is received or not.

The time at which the discard message is transmitted is differently controlled in order to appropriately control the number of times of packet retransmissions by separately managing the ARQ transmitter receiving the NACK message and the ARQ transmitter receiving no NACK message. For example, packets will not be appropriately retransmitted if a packet is retransmitted once and then discarded, and another packet is retransmitted many times and discarded. That is, when QoS statistics are calculated only with reference to the ARQ_BLOCK_LIFETIME, the statistics of a session having performed a great number of times of retransmissions correspond to the statistics of a session having performed a less number of times of retransmissions, and therefore fallacy statistics are given.

FIG. 13 shows a flow chart for representing a method for retransmitting a packet according to the exemplary embodiment of the present invention.

A data packet is transmitted from the transmission unit in step S110, and the receipt unit determines whether the transmitted data packet is successfully received in step S210.

When successfully receiving the packet, the receipt unit transmits the ACK message as the ARQ feedback message in step S230. The transmission unit receiving the ACK message discards the data packet corresponding to the ACK message from the buffer and prepares to transmit another data packet.

When an error occurs in the packet received by the receipt unit, the receipt unit transmits the NACK message indicating a failure for receiving the data packet.

When the transmission unit receives the NACK message or the transmission unit receives no ACK or NACK message before the waiting time for retransmitting the packet expires after transmitting the data packet, the transmission unit determines to retransmit the data packet and retransmits a data packet corresponding to the previous data packet in step S120. When the transmission unit determines to retransmit the data, the transmission unit returns to step S110 to transmit the data.

The transmission unit determines whether a maximum packet transmission time determined by the ARQ transmitter expires in step S130. The transmission unit does not retransmit the data packet but determines whether the ACK message is received from the receipt unit in step 150 when the allocated maximum packet transmission time expires in step S130. At this time, it is not necessary to discern whether the ACK message is a confirmation for the transmitted data packet or a confirmation for the data discard order, and the transmission unit stops transmitting the data packet to discard the data packet in the buffer in step S170 when the transmission unit receives the ACK message as the ARQ feedback message.

In steps S130 and S140, the transmission unit determines whether the number of times of retransmissions exceeds the established maximum number of times of retransmissions when the ARQ transmitter receives the NACK message. The transmission unit does not retransmit the data packet but determines whether the ACK message is received as the ARQ feedback message in step S150 when the number of times of retransmissions exceeds the established maximum number of times of retransmissions when the maximum time established in the ARQ transmitter does not expire. At this time, the data packet is discarded in the buffer regardless of the discard message transmission in step S170 when the ACK message is received.

When not receiving the ACK message, the ARQ transmitter transmits an additional discard message and checks the ACK message in step S160. At this time, the data packet is discarded in the buffer in step S170 without discerning whether the ACK message is for the transmitted data or for the discard message when the ACK message is received.

According to the exemplary embodiment of the present invention, the buffer is efficiently and simply managed because the transmission buffer is correspondingly managed to discard the data packet once the ARQ transmitter receives the ACK message in the discard state.

In addition, the fallacy statistics are prevented and the retransmission is appropriately performed because the discard condition is derived with reference to not only a maximum time used for the ARQ but also the number of times of retransmissions according to the NACK message.

FIG. 14 shows a flow chart representing an operation of the ARQ receiver according to the exemplary embodiment of the present invention.

The flow chart represents an operation of the ARQ receiver operating correspondingly to the operation of the ARQ transmitter.

When receiving an ARQ block, the ARQ receiver determines whether the block sequence number of the received block is in an ARQ window range established by the ARQ receiver in step S300.

The ARQ receiver establishes a predetermined number of blocks as a window to be after the last acknowledged block sequence number and determines whether the block sequence number of the received ARQ block is in the ARQ window range. When the block sequence number is not in the ARQ window range, the block is discarded in step S330.

When the ARQ block is in the ARQ window range, the ARQ receiver determines whether the received block is duplicated in step S340. The block is duplicated when the acknowledged block is falsely reported as the negatively acknowledged block, and therefore the acknowledged block is retransmitted because a radio environment between the transmission unit and the receipt unit is bad.

When the block is duplicated, the ARQ receiver moves to step S372 and establishes a predetermined timer to discard the ARQ block corresponding to the block sequence number. At this time, a timer's waiting time is a parameter of ARQ_RX_TIMEOUT, which is defined as a time interval that the receiver waits after successful reception of a block that does not result in advancement of ARQ_RX_WINDOW_START.

When the block is not duplicated, the block sequence number corresponding to the received ARQ block is added to a list of BSNs to be acknowledged, and the ARQ block is stored to the buffer in step S350.

The ARQ receiver determines whether the block sequence number of the stored block is a receipt window start block ARQ_RX_WINDOW_START in step S360.

For example, the ARQ receiver determines whether the block sequence number of the received block is 6 when the block sequence number of the receipt window is established from 6 to 10.

When the block sequence number corresponds to the receipt window start block, the ARQ receiver determines whether the receipt window start block corresponds to a block sequence number value ARQ_RX_HIGHEST_BSN which is a value after the received block sequence number value in step S380.

When the ARQ_RX_WINDOW_START and the ARQ_RX_HIGHEST_BSN correspond to each other, values of the ARQ_RX_WINDOW_START and the ARQ_RX_HIGHEST_BSN are respectively increased by 1 in step S382.

When the ARQ_RX_WINDOW_START and the ARQ_RX_HIGHEST_BSN are different from each other, the value of the ARQ_RX_WINDOW_START is updated in step S381.

When the value of the ARQ_RX_WINDOW_START or the ARQ_RX_HIGHEST_BSN is updated, a predetermined timer is established in step S383. The ARQ receiver moves to a state of DONE in step S390.

The ARQ receiver determines whether the block sequence number is greater than the ARQ_RX_HIGHEST_BSN in step S370 when the block sequence number of the received block is not in the ARQ receipt window start block.

When the receipt block sequence number is greater than the ARQ_RX_HIGHEST_BSN, the ARQ_RX_HIGHEST_BSN is increased to be updated in step S371.

However, the ARQ receiver moves to the state of DONE in step S390 after the predetermined time in step S372 because the ARQ receiver has received the acknowledged block when the receipt block sequence number is not greater than the ARQ_RX_HIGHEST_BSN.

As described, the ARQ receiver performs the ACK message transmission and receipt window update operation which are proper for the ARQ transmitter.

A program having the above described functions is programmed to a computer readable medium to thus control the ARQ transmitter in the transmission unit or the ARQ receiver in the receipt unit.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the packet retransmission method of the present invention, when the transmitted data packet is discarded, the buffer is efficiently managed because the packet is discarded in the buffer by receiving the ACK message without determining whether the additional discard message is transmitted. In addition, the overhead of the ARQ feedback message for responding to the discard message is reduced because it is not required to respond to the additional discard message.

When the packet is discarded, the packet moves to the discard state not only when the maximum management time of the ARQ block expires but also when the number of times of retransmissions exceeds the maximum number of times of retransmissions after the NACK message is received. Accordingly, the retransmission is fairly performed and the efficient scheduling is provided.

What is claimed is:

1. A method for receiving an Automatic Repeat reQuest (ARQ) block, comprising:
   if an ARQ block is received, determining if a block sequence number of the ARQ block is in a range of a receipt window;
   if the block sequence number of the ARQ block is in the range of the receipt window, determining if the ARQ block is a duplicate of a previously received ARQ block;
   if the ARQ block is not a duplicate and the block sequence number of the ARQ block is not less than a highest block sequence number of received ARQ blocks, updating the highest block sequence number of received blocks; and
   if the ARQ block is not a duplicate and the block sequence number of the ARQ block is equal to a start block sequence number of the receipt window, updating the start block sequence number of the receipt window.

2. The method of claim 1, further comprising:
   if the block sequence number of the ARQ block is not equal to the start block sequence number of the receipt window, setting a first timer; and
   if the block sequence number of the ARQ block is equal to the start block sequence number of the receipt window, setting a second timer.

3. The method of claim 2, further comprising:
   setting the first timer if the ARQ block is a duplicate.

4. The method of claim 3, wherein the first timer is defined as a time interval for waiting after a successful reception of a block that does not result in an advancement of the start block sequence number of the receipt window.

5. The method of claim 4, further comprising:
   if the block sequence number of the ARQ block is not in the range of the receipt window, discarding the ARQ block.

6. The method of claim 5, further comprising:
   if the block sequence number of the ARQ block is in the range of the receipt window, adding the block sequence number of the ARQ block to a list to be acknowledged.

7. A computer-readable medium that stores instructions executable by at least one processor to perform a method comprising:
   if an ARQ block is received, determining if a block sequence number of the ARQ block is in a range of a receipt window;
   if the block sequence number of the ARQ block is in the range of the receipt window, determining if the ARQ block is a duplicate of a previously received ARQ block;
   if the ARQ block is not a duplicate and the block sequence number of the ARQ block is not less than a highest block sequence number of received blocks, updating the highest block sequence number of received blocks; and
   if the ARQ block is not a duplicate and the block sequence number of the ARQ block is equal to a start block sequence number of the receipt window, updating the start block sequence number of the receipt window.

8. The computer-readable medium of claim 7, wherein the method further comprises:
   if the block sequence number of the ARQ block is not equal to the start block sequence number of the receipt window, setting a first timer; and
   if the block sequence number of the ARQ block is equal to the start block sequence number of the receipt window, setting a second timer.

9. The computer-readable medium of claim 8, wherein the method further comprises:
   if the ARQ block is a duplicate, setting the first timer.

10. The computer-readable medium of claim 9, wherein the first timer is defined as a time interval for waiting after successful reception of a block that does not result in advancement of the start block sequence number of the receipt window.

11. The computer-readable medium of claim 10, wherein the method further comprises:
    if the block sequence number of the ARQ block is not in the range of the receipt window, discarding the ARQ block.

12. The computer-readable medium of claim 11, wherein the method further comprises:
    if the block sequence number of the ARQ block is in the range of the receipt window, adding the block sequence number of the ARQ block to a list to be acknowledged.

13. A method for a transmitter to retransmit a packet to a receiver, comprising:
    if a transmitter does not receive an acknowledgment message for a packet transmitted to the receiver, setting a retransmission timeout;
    if the retransmission timeout expires, retransmitting the packet;
    if a maximum management time expires, transmitting a discard message for the packet to the receiver and transiting to a discarded state; and
    if the transmitter receives, in the discarded state, the acknowledgment message for the packet or an acknowledgment message for the discard message, discarding the packet from a transmitting buffer.

14. The method of claim 13, further comprising:

setting a maximum number of retransmissions;

if the transmitter receives a non-acknowledgment message for the packet from the receiver, retransmitting the packet; and if a number of retransmissions of the packet exceeds the maximum number of retransmissions, transiting to the discarded state.

15. A method for a transmitter to retransmit an Automatic Repeat reQuest (ARQ) block to a receiver, comprising:

if the transmitter transmits the ARQ block to the receiver in a not-sent state of the ARQ block, transiting a state of the ARQ block to an outstanding state;

if the transmitter does not receive an acknowledgment message for the ARQ block for a timeout in the outstanding state, or if the transmitter receives a non-acknowledgment message for the ARQ block in the outstanding state, transiting the state of the ARQ block to a retransmission-waiting state;

if the transmitter retransmits the ARQ block to the receiver in the retransmission-waiting state, transiting the state of the ARQ block to the outstanding state;

if a lifetime of the ARQ block expires in the outstanding state, transiting the state of the ARQ block to a discarded state; and if the transmitter receives, in the discarded state, an acknowledgment message for the ARQ block or an acknowledgment message for a discard message for the ARQ block, transiting the state of the ARQ block to a done state.

16. The method of claim 15, wherein transiting the state of the ARQ block to the done state comprises:

if the transmitter receives, in the discarded state, the acknowledgment message for the ARQ block or the acknowledgment message for the discard message for the ARQ block, discarding the ARQ block.

17. The method of claim 16, further comprising:

if the lifetime of the ARQ block expires in the retransmission-waiting state, transiting the state of the ARQ block to the discarded state.

18. The method of claim 17, further comprising:

if the transmitter receives an acknowledgment message for the ARQ block in the outstanding state, transiting the state of the ARQ block to the done state; and if the transmitter receives an acknowledgment message for the ARQ block in the retransmission-waiting state, transiting the state of the ARQ block to the done state.

19. The method of claim 15, further comprising:

if a number of retransmissions of the ARQ block exceeds a predetermined number of retransmissions, transiting the state of the ARQ block to the discarded state.

20. A method for a transmitter to retransmit an automatic repeat request (ARQ) block to a receiver, comprising:

if the transmitter transmits the ARQ block to the receiver in a not-sent state of the ARQ block, transiting a state of the ARQ block to an outstanding state;

if the transmitter does not receive an acknowledgment message for the ARQ block for a timeout in the outstanding state, transiting the state of the ARQ block to a retry-timeout state;

if the transmitter receives a non-acknowledgment message for the ARQ block in the outstanding state, transiting the state of the ARQ block to a non-acknowledged state;

if the transmitter receives a non-acknowledgment message for the ARQ block in the retry-timeout state, transiting the state of the ARQ block to the non-acknowledged state;

if the transmitter retransmits the ARQ block to the receiver in the retry-timeout state, transiting the state of the ARQ block to the outstanding state;

if the transmitter retransmits the ARQ block to the receiver in the non-acknowledged state, transiting the state of the ARQ block to the outstanding state;

if a lifetime of the ARQ block expires in the outstanding state, transiting the state of the ARQ block to the discarded state; and if the transmitter receives, in the discarded state, an acknowledgment message for the ARQ block or an acknowledgment message for a discard message for the ARQ block, transiting the state of the ARQ block to a done state.

21. The method of claim 20, further comprising:

if a lifetime of the ARQ block expires in the retry-timeout state, to discard the ARQ block, transiting the state of the ARQ block to the discarded state; and if the lifetime of the ARQ block expires in the non-acknowledged state, to discard the ARQ block, transiting the state of the ARQ block to the discarded state.

22. The method of claim 21, further comprising:

if the transmitter receives an acknowledgement message for the ARQ block in the retry-timeout state, transiting the state of the ARQ block to the done state;

if the transmitter receives an acknowledgement message for the ARQ block in the outstanding state, transiting the state of the ARQ block to the done state; and if the transmitter receives an acknowledgement message in the non-acknowledged state, transiting the state of the ARQ block to the done state.

23. The method of claim 20, further comprising:

if a number of retransmissions of the ARQ block exceeds a predetermined number of retransmissions, transiting the state of the ARQ block to the discarded state.

* * * * *